H. L. BOSTATER.
CLUTCH FOR SPEED REGULATORS.
APPLICATION FILED DEC. 1, 1910. RENEWED JAN. 15, 1912.
1,018,476. Patented Feb. 27, 1912.
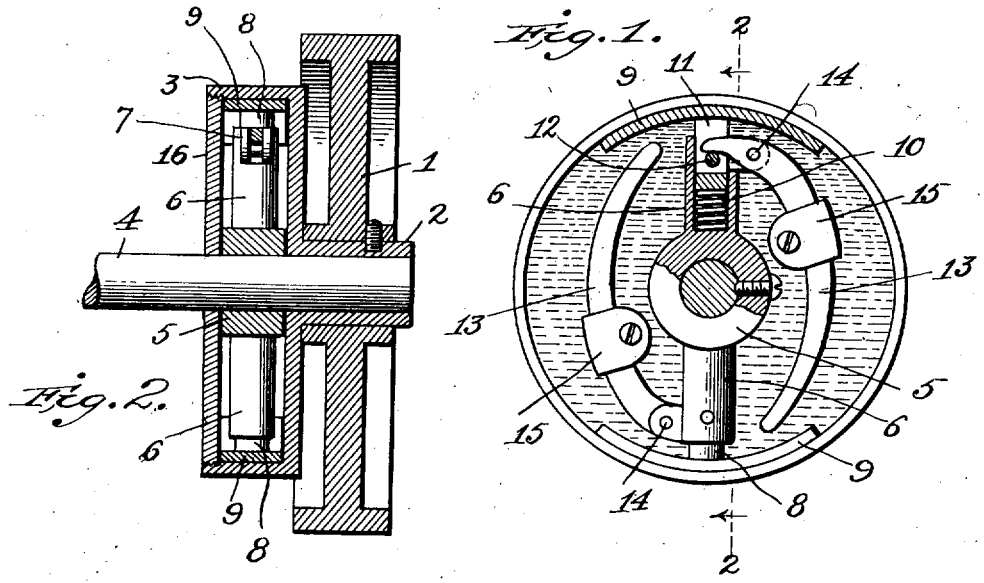
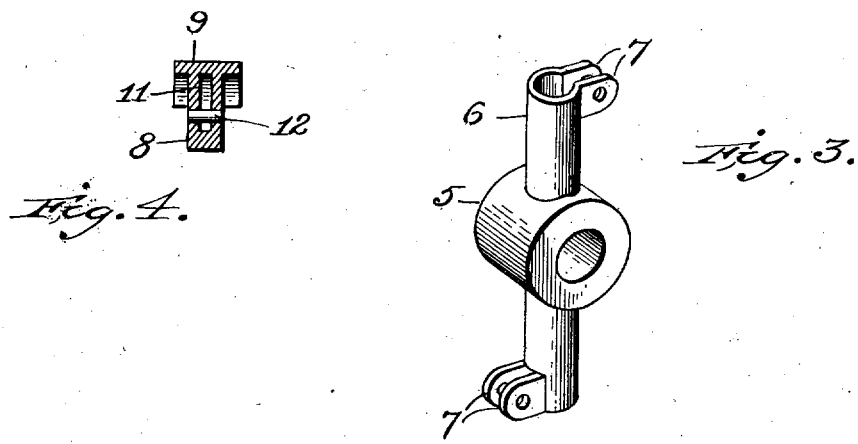

UNITED STATES PATENT OFFICE.

HERBERT L. BOSTATER, OF CHICAGO, ILLINOIS.

CLUTCH FOR SPEED-REGULATORS.

1,018,476. Specification of Letters Patent. Patented Feb. 27, 1912.

Application filed December 1, 1910, Serial No. 595,063. Renewed January 15, 1912. Serial No. 671,292.

*To all whom it may concern:*

Be it known that I, HERBERT L. BOSTATER, a citizen of the United States, residing at Chicago, in the county of Cook and State of Illinois, have invented new and useful Improvements in Clutches, More Particularly Designed as Speed-Regulators for Electric Generators, of which the following is a specification.

My invention relates to clutches, more particularly designed as speed regulators for electric generators, and has for its object certain improvements in the construction of the same as will be hereinafter more definitely pointed out and claimed.

In the accompanying drawing; Figure 1 is a transverse sectional view of my improved device. Fig. 2 has a sectional view taken at a right angle to Fig. 1 and on the line 2—2 thereof. Fig. 3 is a detail perspective view of the hub and sleeves for holding the clutch shoes. Fig. 4 is a detail transverse sectional view through one of the clutch shoes.

In the said drawing the reference numeral 1 denotes a drive wheel, which may be varied in diameter to suit driving conditions, actuated from any suitable source of power, and keyed to a sleeve 2 formed integral with the clutch shell 3, said clutch shell and sleeve 2 being adapted to freely rotate upon the armature or driven shaft 4. Keyed to shaft 4 is a member comprising a hub 5 having formed integral therewith oppositely disposed sleeves or hollow arms 6, each having at its outer end a pair of ears 7 as shown, which project in opposite directions. Longitudinally movable in each of said sleeves 6 is a stem 8 of the clutch shoe 9, said stems being normally pressed outward by springs 10 and slotted at 11 and provided with cross-pins 12. Extending into said slots and in contact with the pins 12 are the inner ends of levers 13 pivoted at 14 in the ears 7, and having mounted adjustably thereon the weights 15.

The clutch shell is closed by means of a plate 16 in screw threaded engagement therewith, and in use is filled with oil or any other liquid or semi-liquid lubricant.

In operation when power is applied to rotate the drive wheel 1, this motion is communicated to clutch shell 3 and as the clutch shoes 9 are normally forced into contact with said clutch shell through springs 10, the movement will be imparted to shaft 4, and through it to the electric generator. Should the speed of the driving mechanism increase beyond prescribed limits, the centrifugal action will cause the free ends of arms 13 to throw outward on their pivots 14, and their inner ends will through contact with cross-pins 12 force the clutch shoes 9 inward away from contact with the clutch shell 3, and this position will be maintained until the speed of the driving wheel decreases.

The oil filling the clutch shell 3 not only lubricates the parts, but also performs the more important function of acting in the nature of a dash pot in action with the arms 13, it being obvious that the centrifugal movement of said arms will be checked by the oil, and the effect of the same will be to steady the action of the clutch, preventing sudden or jerky movement of the clutch shoes on the clutch shell. The result is a wavelike variation in the current of the generator instead of jerky and abrupt changes.

It will be understood that the clutch can be driven by utilizing the periphery of the shell 3, instead of providing an extra drive wheel as shown.

Having thus described my invention, what I claim as new and desire to secure by Letters Patent is:—

A clutch embodying a driving and a driven member, a closed casing mounted to rotate upon said driven member, a clutch member secured to said driven member and comprising a hub, oppositely disposed sleeves having oppositely extending ears at their outer ends secured to said hub, clutch shoes provided with slotted stems which project into said sleeves, pins extending across said slots, and springs within said sleeves for forcing said clutch shoes into engagement with said casing, and levers pivoted intermediate their length to said ears, one end of each of which is adapted to project into the slots of the clutch stems and to engage the pins therein.

In testimony whereof I have hereunto set my hand in presence of two subscribing witnesses.

HERBERT L. BOSTATER.

Witnesses:
 HARRY F. BROWN,
 SALLIE SPAULDING.